Oct. 27, 1953  G. E. BERGGREN  2,656,566
APPARATUS FOR EXTRUDING PLASTIC MATERIAL
Filed Dec. 4, 1948

INVENTOR
G. E. BERGGREN
BY
ATTORNEY

Patented Oct. 27, 1953

2,656,566

UNITED STATES PATENT OFFICE 2,656,566

APPARATUS FOR EXTRUDING PLASTIC MATERIAL

George E. Berggren, Baltimore, Md., assignor to Western Electric Company, Incorporated, New York, N. Y., a corporation of New York Application December 4, 1948, Serial No. 63,594

1 Claim. (Cl. 18—13)

This invention relates to apparatus for extruding organic, plastic material, and more particularly to apparatus for extruding insulating and jacketing material around filamentary conductors or other cores.

In utilizing much of the rubber or plastics insulating and jacketing equipment available today, the centering of a conductor and a tracer strand extending along the conductor with respect to material extruded therearound is accomplished by adjusting the components of an extruding head manually at each setup for a given combination of conductor and material. Even when skilled operators are employed a considerable amount of operating time is lost in making the adjustments necessary to produce commercially acceptable products.

Much of this time may be saved by the use of a so-called "self-centering" extruding head, which essentially is a head in which the component parts are designed to be assembled in a given position for each setup without any adjustment of the parts. With the use of the self-centering heads the relative positions of the several parts of the head are fixed and the extruding tools are placed in their proper operating positions each time the head is assembled. One satisfactory type of self-centering head is shown in G. L. Cherry Patent 1,862,005, granted June 7, 1932.

The quantity of flow of an extrudable material to an extruding head should be balanced and one of the principal causes of eccentricity of coverings applied to conductors is the presence of unbalanced flow conditions in different portions of the extruding heads. This is especially true when tracer strands are covered along with the cores. Furthermore, with extruding apparatus of the type known in the past, it has been extremely difficult to extrude a covering upon a strand and a tracer strand and still maintain uniform wall thickness of the covering around both the covering and the tracer strand.

An object of the invention is to provide new and improved apparatus for extruding organic, plastic material.

A further object of the invention is to provide new and improved apparatus for extruding insulating and jacketing material on filamentary conductors or other cores.

A further object of the invention is to provide new and improved apparatus for forming coverings around cores consisting of a conductor and a tracer strand extending along the conductor without displacing the tracer strand with respect to the conductor.

An apparatus illustrating certain features of the invention may include an extruding head having a passage formed therethrough, a die mounted in the passage near one end thereof, and a core tube spaced substantially from the die so that plastic material forced through the passage is free to equalize its pressure and flow in the portion of the passage between the core tube and the die.

A complete understanding of the invention may be obtained from the following detailed description of an apparatus forming a specific embodiment thereof, when read in conjunction with the appended drawing, in which.

Figure 1:
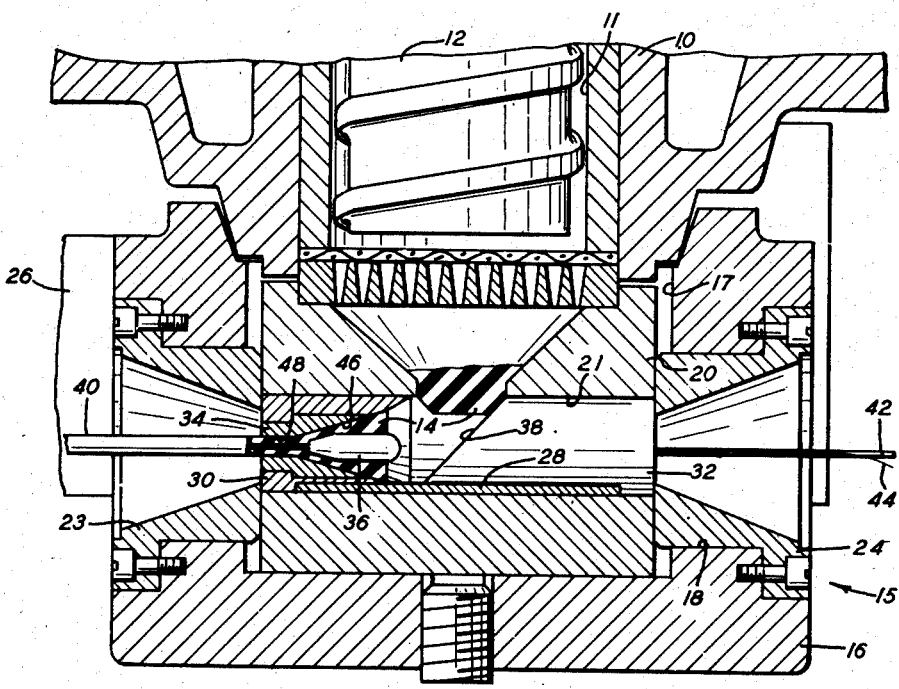
Fig. 1 is a fragmentary, horizontal section of an extruding apparatus illustrating certain features of the invention.

Referring now in detail to the drawing, an extruding cylinder 10 has formed therein a cylindrical bore 11 in which a stock screw 12 rotated by a suitable source of power (not shown) is mounted for the purpose of forcing insulating material 14 through an extruding head designated generally by the numeral 15. The extruding head comprises a body member 16 provided with an opening 17 forming a continuation of the bore 11 and which communicates with a cylindrical bore 18 formed in the body member 16 transversely with respect to the opening 17.

A cylindrical tool holder 20 having a central cylindrical bore 21, which extends coaxially with respect to the bore 18, is removably mounted in the opening 17 and is held in place in the body member 16 by an adapter 23 and a stationary plug 24. A cylindrical vulcanizing tube 26 closes the exit to the adapter 23. An aligning plate 28 holds a die holder 30 and a core tube holder 32 in alignment in the bore 21 in the tool holder 20. The die holder 30 supports a die 34, and the core tube holder 32 mounts a core tube 36 in axial alignment with the die 34. The core tube holder is provided with a deflecting surface 38 which deflects the material 14 from a direction flowing downwardly, as viewed in Fig. 1, to a direction flowing to the left around the core tube 36 and through the die 34 to form a covering 40 around a thin conductor 42 and a tracer strand 44.

The die 34 is provided with a frustoconical passage 46 converging at an angle of about 30° with respect to the longitudinal axis thereof and joining with a cylindrical passage 48. The core tube 36 is provided with a frustoconical portion 50 which is parallel to the frustoconical passage 46. The core tube 36 is provided with a blunt, thick walled end face 52, which causes the movement of the plastic material 14 as the end face is reached to have a large component transverse to the longitudinal axis of the conductor 42 and the tracer strand 44 and to increase in static pressure so that the material presses the strand 44 against the conductor 42. The conductor 42 is guided from the core tube 36 substantially in alignment with the cylindrical portion 48 of the die 34 and the portion of the conductor approaching and passing through the cylindrical passage 48 of the die is centered with respect to the die by equalized pressure of the plastic material 14.

The plastic material 14 flows between the core tube 36 and the frustoconical portion 46 of the die 34, which are spaced apart about 0.060 inch, in a gently converging direction and at a high velocity to the end face 52 of the core tube 36. Just to the left of the end face, as viewed in Fig. 1, the cross sectional area of the flow passage of the material 14 is greater than that just before the end 52 of the core tube so that the material flowing along the frustoconical portion 50 of the core tube changes from directions slightly converging with respect to the longitudinal axes of the conductor 42 and the tracer strand 44 to directions having major components transverse to those axes. This transverse flow of the material and the increase in static pressure force the tracer strand 44 and the conductor 42 together.

Figure 2:
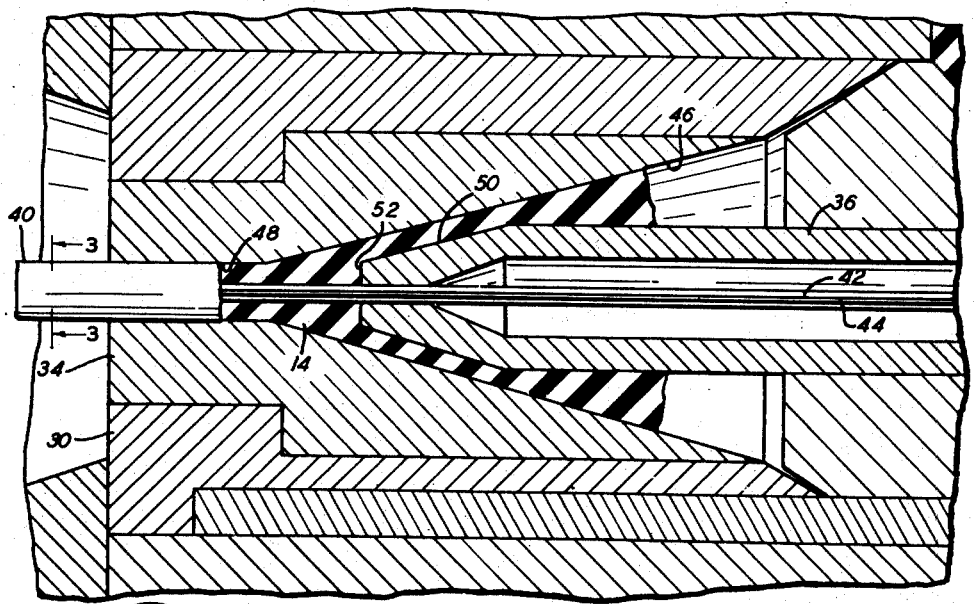
Fig. 2 is an enlarged, fragmentary vertical section of a portion of the apparatus.
Figure 3:
Fig. 3 is an enlarged, vertical section taken along line 3—3 of Fig. 2.

The portion of the frustoconical passage 46 of the die 34 at the left of the end 52 of the core tube 36, as viewed in Fig. 2, is relatively large in cross sectional area so that free flow of the material around the conductor 42 and the tracer strand 44 is permitted, while the cylindrical passage of the die is restricted. Thus, the material flows through alternate relieved and restricted portions after its deflection by the deflecting surface 38 of the core tube holder 32, and each of the restricted portions tends to equalize the pressures of the material on all sides of the core tube 36 and in the relieved portions of the flow passage on the combined core made up of the conductor and the tracer strand. Thus, the pressure of the material on all sides of the portions of the conductor and the tracer strand passing through the cylindrical passage 48 in the die is balanced so that the tracer strand 44 and the conductor 42 are centered in the material as they and the material are drawn through the cylindrical passage 48 in the die.

The above-described apparatus forms coverings concentric to cores by alternately relieving and restricting the flow of the plastic material through the extruding head. Furthermore, since there is a large component of the flow of the material in a direction transverse to the axes of the conductor and the tracer strand just to the left of the end face 52 of the core tube, the tracer strand is pressed closely against the conductor. Since the material may flow freely around the portion of the conductor at the left end of the core tube to balance its pressure all around the conductor, the material does not tend to deflect the conductor and tracer laterally thereby lessening wear of the core tube.

I claim:

An apparatus for extruding organic, plastic material concentrically about a filamentary electrical conductor and a parallel tracer strand, which comprises an extrusion head having an extrusion passage therein, an extrusion die mounted at one end of said passage, a core tube positioned in the passage in axial alignment with the die for guiding a conductor and a parallel tracer strand toward the die, and means for forcing plastic material along the exterior of the core tube around the conductor and the strand and through the die, said die having a cylindrical exit port for shaping the plastic material about the conductor and the tracer strand and having a communicating frustoconical passage the walls of which converge upon the cylindrical port at an angle of about 30°, said core tube having a thick cylindrical wall and a frustoconical tip portion terminating in a blunt, transversely flat end, the frustoconical portion of the core tube being parallel to, projecting into, and sufficiently close to the frustoconical passage in the die to provide a constricted area wherein the plastic material flows at a relatively high velocity to allow the pressure of the advancing plastic material to become equalized circumferentially of the core tube by the time it reaches the flat end thereof, and the blunt end of the core tube being sufficiently thick and being spaced from the exit port of the die a distance sufficient to provide a relieved area wherein the plastic material flows substantially directly toward the conductor under an increased static pressure thereby simultaneously forcing the strand toward the conductor and further equalizing the pressure of the plastic material thereabout.

GEORGE E. BERGGREN.

References Cited in the file of this patent

UNITED STATES PATENTS

| Number | Name | Date |
| --- | --- | --- |
| 466,910 | Royle et al. | Jan. 12, 1892 |
| 1,633,620 | Alderfer | June 28, 1927 |
| 1,812,686 | Crowdes | June 30, 1931 |
| 2,332,538 | Smith | Oct. 26, 1943 |
| 2,401,551 | Cook, Jr. | June 4, 1946 |
| 2,438,974 | Jones | Apr. 6, 1948 |